S. J. PAUL.
TIMING DEVICE FOR ELECTRIC CIRCUITS.
APPLICATION FILED DEC. 11, 1913.
1,184,657.
Patented May 23, 1916.
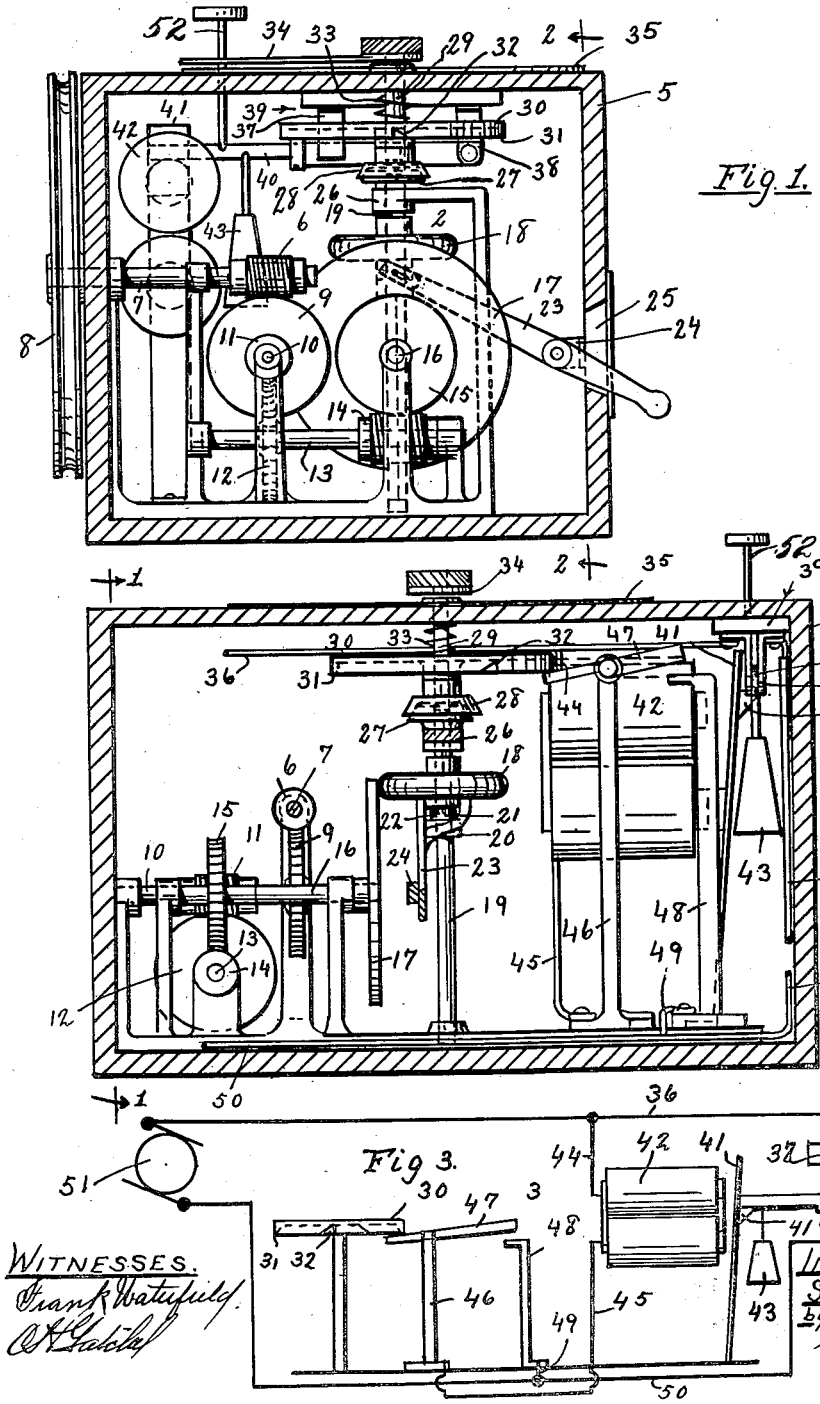

UNITED STATES PATENT OFFICE.

SAMUEL J. PAUL, OF LOS ANGELES, CALIFORNIA.

TIMING DEVICE FOR ELECTRIC CIRCUITS.

1,184,657.     Specification of Letters Patent.     Patented May 23, 1916.

Application filed December 11, 1913. Serial No. 805,892.

*To all whom it may concern:*

Be it known that I, SAMUEL J. PAUL, a citizen of the United States, residing at the city of Los Angeles, in the county of Los Angeles and State of California, have invented new and useful Improvements in Timing Devices for Electric Circuits, of which the following is a specification.

In the operation of mechanism operated by electricity or by explosion engines in which the spark is operated through an electric circuit it is sometimes desirable that the mechanism be operated a certain time and then stopped.

It is the object of my invention to provide mechanism that can be set by the operator to open the electric circuit at any predetermined time whereby the operation of such mechanism is stopped when the electric circuit is opened.

In the drawings forming a part of this application: Figure 1 is a section on the line 1—1 of Fig. 2. Fig. 2 is a section on the line 2—2 of Fig. 1. Fig. 3 is a diagrammatic view of the parts and circuits of my device.

In the drawings 5 is a casing or box in which is mounted a train of worms and worm gears of which I have shown three sets but there may be a larger or smaller number as desired.

6 is the worm of the first set and is mounted on shaft 7 which carries a pulley 8 exterior the box to which power is applied from any source of energy. In the mechanism in which I have used my device pulley 8 is driven by an electric motor, but when used with an explosion engine the pulley would be driven from the crank shaft or other shaft as desired. Worm 6 operates gear 9 on shaft 10. On shaft 10 is mounted worm 11 which operates gear 12. Gear 12 is mounted on shaft 13 and shaft 13 has mounted thereon worm 14 and drives the same. Worm 14 meshes with gear 15 on shaft 16. Shaft 16 carries friction disk 17 that is engaged by friction pinions 18. Pinion 18 is slidably mounted on shaft 19 so as to rotate said shaft when the pinion is rotated as hereafter explained. Pinion 18 has a hub 20 in which is a groove 21. A collar 22 is mounted in this groove. A shifting lever 23 is connected to the collar in such manner that the pinion can be moved up or down with reference to the friction disk so as to vary the speed of the pinion. Lever 23 is mounted on bearing 24 secured to the side of the casing and the end thereof may project through a slot 25 in the casing so that the operator can easily shift the position of the pinion. Shaft 19 passes through a bearing 26 secured to the casing and on the upper end of said shaft is the lower member 27 of a friction clutch. The upper member 28 of this friction clutch is mounted on shaft 29 which passes through the top of the box and is revoluble therein.

Just above the clutch on the shaft 29 is mounted a disk shaped circuit controller 30 which has a depending flange 31 around the edge. In this flange are one or more notches 32 for a purpose hereafter to be explained. Coiled around shaft 29 between controller 30 and the top of the box is a spring 33 which normally holds the members of the clutch in engagement. On shaft 29 exterior the box is mounted an index finger or pointer 34 which travels over a clock dial 35 mounted on the top of the box. The feed wire 36 of the operating circuit of the mechanism to which my timing device is applied is connected to contacts 37 and 38 of the switch 39 which is preferably a knife switch. Switch lever 40 of switch 39 is pivotally connected to contact 38 and extends to and is held by lug 41$^a$ of armature 41 of magnet 42 in engagement with contact 37 when the operating circuit is closed. A weight 43 is connected to lever 40 so that when lug 41$^a$ is withdrawn from beneath the lever by the action of the magnet the lever is disconnected from contact 37 and the operating circuit is opened. One side of magnet 42 is connected to wire 36 by wire 44. The other side of the magnet 42 is connected by wire 45 with contact post 46 in which is pivotally mounted contact lever 47 which is normally held out of engagement with contact post 48 by disk 30.

Contact post 48 is connected by line 49 with ground wire 50. A motor 51 operates the mechanism and drives the pulley 8.

In the operation of my mechanism the index pointer is turned to such point on the dial as indicates the number of minutes or hours, or hours and minutes that it is desired to have the mechanism operate. It will be understood that when the mechanism is not being operated switch bar 40 will be disengaged from contact 37 and the operating circuit will be open. In setting the index pointer the members of the friction clutch on shafts 19 and 29 are separated, the upper member being raised. As soon as the pointer is set at the desired point the clutch members are again caused to engage by spring 33. At the same time contact lever 47 is disengaged from contact 48 thereby opening the operating circuit of magnet 42. Switch bar 40 is then drawn into position by means of a rod 52. As the bar 40 moves upwardly it wipes past lug 41ª of armature 41 and the armature springs back and lug 41ª holds switch bar 40 in engagement with contact 37. When disk 30 has been rotated the required time notch 32 is brought into register with the end of contact lever 47. This permits the outer end of lever 47 to drop upon contact post 48 and close the circuit of magnet 42. As soon as the circuit of magnet 42 is closed the magnet draws its armature and withdraws lug 41ª from longer supporting lever 40. The free end of lever 40 then drops thereby disengaging itself from contact 37 and opening the operating circuit.

It will be observed that by this construction a simple and efficient timing device is provided that will operate automatically. Each of the shafts carrying a worm could be connected up to an independent timing device if it is desired to operate a number of different circuits at the same time. Disk 30 could be provided with a plurality of depending flanges each of which could operate a disconnected switch on a different circuit. A plurality of notches in disk 30 could operate a plurality of switches for opening operating circuits at different times. Or notch 32 can be used for opening different operating circuits at different times.

While I have shown what I conceive to be the best form of device for opening an electric circuit at a predetermined time it will be understood that many variations in the mechanism may be adopted without departing from the spirit of my invention.

Having described my invention what I claim is:

1. A timing device for electric circuits comprising a set of worms and worm gears; an electric motor for operating said gears; an electric circuit for said motor, said circuit having a switch therein; a magnet; a normally open circuit for said magnet connected in shunt upon said main circuit: an armature for said magnet adapted when energized to release the switch of the main circuit whereby both the main and shunt circuits are opened; a friction disk operable by said set of gearing; an adjustable friction pinion contacting with and operable by said disk; and means operable by said pinion to close the circuit of the magnet at a predetermined time.

2. A timing device for electric circuits comprising a set of gears; a friction disk operable by said gears; a shaft; a friction pinion in engagement with said disk, said pinion being slidably and non-revolubly mounted on said shaft; means to shift the position of said pinion on said shaft; a clutch member on said shaft; a controller shaft in alinement with the pinion shaft; a clutch member on the controller shaft engaging the clutch member on the pinion shaft; a controller disk on said last shaft, said disk having a flange with a notch therein; a pointer mounted on the controller shaft; a dial below the pointer; a main electric circuit having a pivoted switch therein; a weight on the free end of said switch; a magnet; an armature adapted to hold the switch of the circuit closed; a normally open shunt circuit for said magnet, said shunt circuit being connected to said main circuit; a contact bar to close said shunt circuit, said bar being held from closing the shunt circuit by the flange of the controller disk until released therefrom by the bar reaching the notch in said flange.

In witness that I claim the foregoing I have hereunto subscribed my name this 21st day of November, 1913.

SAMUEL J. PAUL.

Witnesses:
G. E. HARPHAM,
FRANK WATERFIELD.